(12) United States Patent
Mann et al.

(10) Patent No.: US 12,001,484 B2
(45) Date of Patent: Jun. 4, 2024

(54) LOW LATENCY MULTI-CONSTRAINT RANKING OF CONTENT ITEMS

(71) Applicant: DeepMind Technologies Limited, London (GB)

(72) Inventors: Timothy Arthur Mann, Harpenden (GB); Ivan Lobov, St. Albans (GB); Anton Zhernov, London (GB); Krishnamurthy Dvijotham, London (GB); Xiaohong Gong, Sunnyvale, CA (US); Dan-Andrei Calian, London (GB)

(73) Assignee: DeepMind Technologies Limited, London (GB)

( * ) Notice: Subject to any disclaimer, the term of this patent is extended or adjusted under 35 U.S.C. 154(b) by 452 days.

(21) Appl. No.: 17/177,097

(22) Filed: Feb. 16, 2021

(65) Prior Publication Data

US 2021/0256072 A1 Aug. 19, 2021

Related U.S. Application Data

(60) Provisional application No. 62/976,302, filed on Feb. 13, 2020.

(51) Int. Cl.
*G06F 16/95* (2019.01)
*G06F 16/903* (2019.01)
(Continued)

(52) U.S. Cl.
CPC ........ *G06F 16/90335* (2019.01); *G06F 17/11* (2013.01); *G06F 17/16* (2013.01)

(58) Field of Classification Search
CPC .................................. G06F 16/90335
See application file for complete search history.

(56) References Cited

U.S. PATENT DOCUMENTS 10,108,526 B2 * 10/2018 Sisman ................. G06F 11/362
2016/0055124 A1 * 2/2016 Galvin ..................... G06F 17/16
708/520

(Continued)

OTHER PUBLICATIONS

Agarwal et al., "Click shaping to optimize multiple objectives," Proceedings of the 17th ACM SIGKDD international conference on Knowledge discovery and data mining, Aug. 2011, 9 pages.

(Continued)

*Primary Examiner* — Mohammad S Rostami
(74) *Attorney, Agent, or Firm* — Fish & Richardson P.C.

(57) ABSTRACT

Methods and systems for low-latency multi-constraint ranking of content items. One of the methods includes receiving a request to rank a plurality of content items for presentation to a user to maximize a primary objective subject to a plurality of constraints; initializing a dual variable vector; updating the dual variable vector, comprising: determining an overall objective score for the dual variable vector; identifying a plurality of candidate dual variable vectors that includes one or more neighboring node dual variable vectors; determining respective overall objective scores for each of the one or more candidate dual variable vectors; identifying the candidate with the best overall objective score; and determining whether to update the dual variable vector based on whether the identified candidate has a better overall objective score than the dual variable vector; and determining a final ranking for the content items based on the dual variable vector.

18 Claims, 3 Drawing Sheets

(51) Int. Cl.
  *G06F 17/11* (2006.01)
  *G06F 17/16* (2006.01)

(56) References Cited

U.S. PATENT DOCUMENTS

| | | | | |
|---|---|---|---|---|
| 2017/0185599 | A1* | 6/2017 | Glover | G06F 16/9537 |
| 2018/0276564 | A1* | 9/2018 | Varma | G06F 17/16 |
| 2019/0163766 | A1* | 5/2019 | Gulati | G06F 16/532 |
| 2019/0163768 | A1* | 5/2019 | Gulati | G06F 16/56 |
| 2020/0033822 | A1* | 1/2020 | Danielson | G05B 13/048 |
| 2021/0004703 | A1* | 1/2021 | Zoldi | G06Q 40/02 |

OTHER PUBLICATIONS

Agarwal et al., "Constrained optimization for homepage relevance," Proceedings of the 24th International Conference on World Wide Web, May 2015, 10 pages.

Agarwal et al., "Personalized click shaping through lagrangian duality for online recommendation," Proceedings of the 35th international ACM SIGIR conference on Research and development in information retrieval, Aug. 2012, 10 pages.

Andersen et al., "Implementation of interior-point methods for large scale linear programs," Interior Point Methods of Mathematical Programming, 1996, 2 pages.

Biega et al., "Equity of attention: Amortizing individual fairness in rankings," The 41st international acm sigir conference on research & development in information retrieval, Jun. 2018, 10 pages.

Boyd et al., "Lecture note on subgradient methods," Stanford University, May 2014, 39 pages.

Burges et al., "Learning to rank using gradient descent," Proceedings of the 22nd international conference on Machine learning, Aug. 2005, 8 pages.

Celis et al., "Ranking with fairness constraints," arXiv preprint arXiv:1704.06840, Apr. 2017, 32 pages.

Craswell et al., "An experimental comparison of click position-bias models," Proceedings of the 2008 international conference on web search and data mining, Feb. 2008, 8 pages.

Deerwester et al., "Indexing by latent semantic analysis," Journal of the American society for information science, Sep. 1990, 41(6):391-407.

Developers.google.com [online], "Google's open-source linear programming system," retrieved on Feb. 8, 2021, retrieved from URL<https://developers.google.com/optimization/lp/glop#declare-the-lp-solver>, 22 pages.

Ding et al., "Whole page optimization with global constraints," Proceedings of the 25th ACM SIGKDD International Conference on Knowledge Discovery & Data Mining, Jul. 2019, 9 pages.

Duff et al., "On algorithms for permuting large entries to the diagonal of a sparse matrix," SIAM Journal on Matrix Analysis and Applications, 2001, 22(4):973-96.

Dufossé et al., "Notes on Birkhoff-von Neumann decomposition of doubly stochastic matrices," Linear Algebra and its Applications, May 2016, 497:108-15.

Ford et al., "A suggested computation for maximal multi-commodity network flows," Management Science, Oct. 1958, 5(1):97-101.

Gurobi.com [online], "Gurobi Optimizer" retrieved on Feb. 8, 2021, retrieved from URL<https://www.gurobi.com/products/gurobi-optimizer>, 15 pages.

Jannach et al., "Recommender systems—beyond matrix completion," Communications of the ACM, Oct. 2016, 59(11):94-102.

Miller et al., "Response time in man-computer conversational transactions," Proceedings of the Dec. 9-11, 1968, fall joint computer conference, Dec. 1968, 267-277.

Page et al., "The pagerank citation ranking: Bringing order to the web," Technical Report, Stanford InfoLab, Jan. 1998, 17 pages.

Radlinski et al., "Learning diverse rankings with multi-armed bandits," Proceedings of the 25th international conference on Machine learning, Jul. 2008, 8 pages.

Shah et al., "Online Ranking with Constraints: A Primal-Dual Algorithm and Applications to Web Traffic-Shaping," Proceedings of the 23rd ACM SIGKDD International Conference on Knowledge Discovery and Data Mining, Aug. 2017, 23 pages.

Singh et al., "Fairness of exposure in rankings, " Proceedings of the 24th ACM SIGKDD International Conference on Knowledge Discovery & Data Mining, Jul. 2018, 10 pages.

Singh et al., "Policy learning for fairness in ranking," arXiv preprint, arXiv:1902.04056, Feb. 2019, 16 pages.

Zoghi et al., "Online learning to rank in stochastic click models," International Conference on Machine Learning, Jul. 2017, 10 pages.

* cited by examiner

```
Receive ranking request
202
          ↓
Initialize dual variable vector
204
          ↓
Update dual variable vector
206
          ↓
Determine a final ranking
208
          ↓
Provide content items for presentation according to
the ranking
210
```

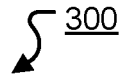

```
                    ┌──────────────────────────────────────┐
                    │ Determine an overall objective score │
                    │      for the dual variable vector    │
                    │                 302                  │
                    └──────────────────┬───────────────────┘
                                       ▼
                    ┌──────────────────────────────────────┐
                    │  Identify candidate dual variable    │
                    │               vectors                │
                    │                 304                  │
                    └──────────────────┬───────────────────┘
                                       ▼
                    ┌──────────────────────────────────────┐
                    │ Determine overall objective scores   │
                    │  for the candidate dual variable     │
                    │              vectors                 │
                    │                 306                  │
                    └──────────────────┬───────────────────┘
                                       ▼
                    ┌──────────────────────────────────────┐
                    │ Identify candidate dual variable     │
                    │  vector with the best overall        │
                    │           objective score            │
                    │                 308                  │
                    └──────────────────┬───────────────────┘
                                       ▼
                    ┌──────────────────────────────────────┐
                    │ Determine whether to update the      │
                    │         dual variable vector         │
                    │                 310                  │
                    └──────────────────────────────────────┘
```

FIG. 3

LOW LATENCY MULTI-CONSTRAINT RANKING OF CONTENT ITEMS

CROSS-REFERENCE TO RELATED APPLICATION

This application claims priority to U.S. Provisional Application No. 62/976,302, filed on Feb. 13, 2020. The disclosure of the prior application is considered part of and is incorporated by reference in the disclosure of this application.

BACKGROUND

This specification relates to ranking content items for presentation to a user.

Many systems are required to rank content items before the content items are presented to a user, e.g., in response to a search query submitted by the user. Some of these systems rank these content items only to optimize some primary objective, e.g., to maximize some measure of user interaction with the ranked content items. Others of these systems, however, rank the content items to optimize the primary objective, but subject to one or more additional constraints.

SUMMARY

This specification describes a system of one or more computers in one or more physical locations that ranks content items for presentation to a user in a manner that satisfies multiple constraints in expectation and with minimal latency.

The subject matter described in this specification can be implemented in particular embodiments so as to realize one or more of the following advantages.

Conventional approaches to solving constrained ranking problems struggle to produce high quality solutions in environments that have strict latency requirements. Examples of such environments include ranking content items for presentation to users in response to user queries where only a small amount of latency is acceptable before the user experience is negatively impacted. The described techniques, on the other hand, find high quality rankings that optimize a primary objective while satisfying multiple constraints in expectation within the strict latency requirements of practical systems serving live traffic. As one particular example, the described techniques can provide high-quality rankings with a latency that is well within a range of 50 milliseconds and can therefore be effectively incorporated in production systems. Thus, by using the described techniques, production systems can produce rankings that satisfy strict latency constraints while taking into consideration a much larger number of constraints than when using conventional ranking techniques. This results in higher quality rankings being presented to users and significantly improves the user experience without introducing additional latency into the production system.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 3 is a flow diagram of an example process for updating the dual variable vector.

Like reference numbers and designations in the various drawings indicate like elements.

DETAILED DESCRIPTION

This specification describes a ranking system implemented as one or more computer programs on one or more computers in one or more locations that ranks content items for presentation to a user. In particular, the system ranks the content items using a ranking scheme that allows the system to find high quality rankings that optimize a primary objective while satisfying multiple constraints in expectation within strict latency requirements, e.g., within the strict latency requirements of serving live traffic.

Figure 1:
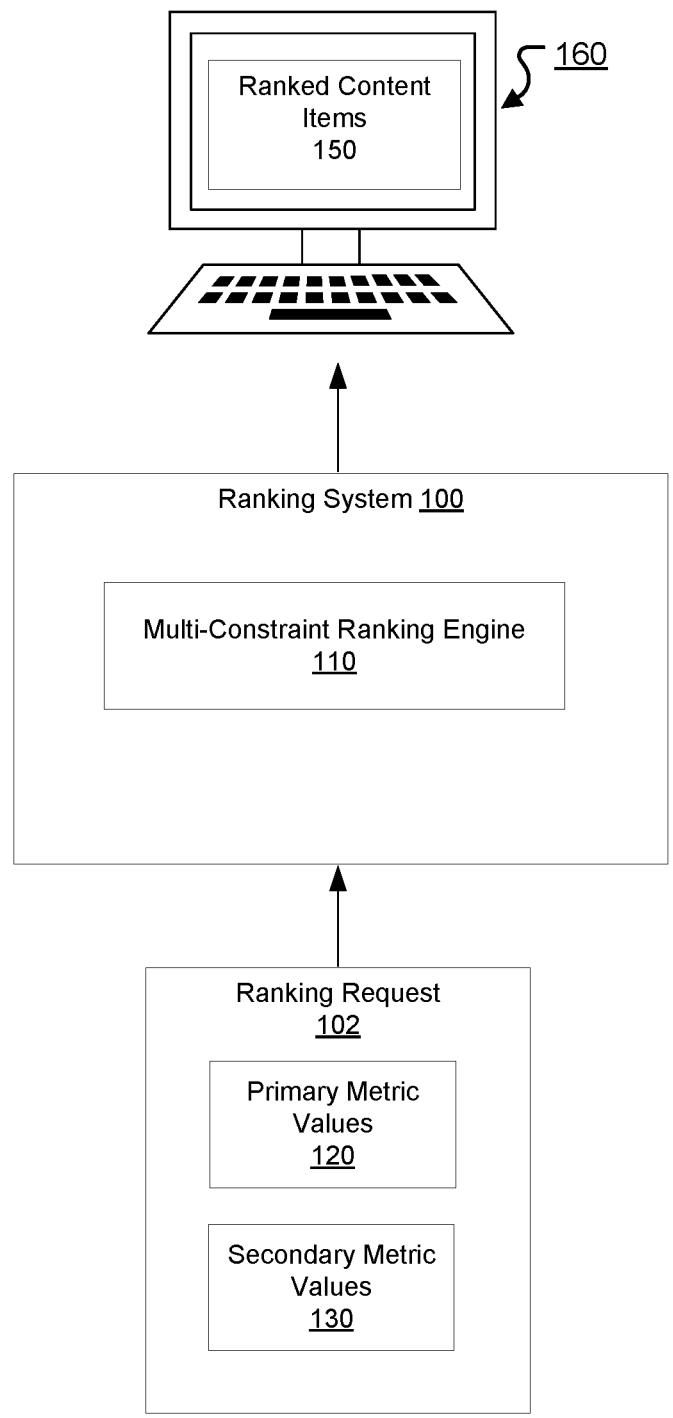
FIG. 1 shows an example ranking system.

FIG. 1 shows an example ranking system 100. The ranking system 100 is an example of a system implemented as computer programs on one or more computers in one or more locations, in which the systems, components, and techniques described below can be implemented.

In particular, the system 100 receives a request 102 to rank a plurality of content items, e.g., videos, search results, images, software applications, advertisements, electronic books, or other electronic content that can be presented to a user on a user device 160, for presentation to a user to maximize a primary objective subject to a plurality of constraints.

As a particular example, the system 100 can receive the request 102 in response to a search query submitted by the user through the user device 160, e.g., a mobile device, computer, or other user computer. For example, the search query can be submitted to an Internet search engine, a video search engine that searches a repository of videos, an app store search engine that searches a collection of software applications available for download, a.

As another particular example, the system 100 can receive a request from another system for content items to be presented to the user on the user device 160, e.g., as recommendations to be presented with another piece of content selected by the user. For example, the system 100 can receive a request from a streaming video system for recommendations to be shown with a video currently being viewed by the user. As another example, the system 100 can receive a request from an app store search engine for recommendations to be shown on a page that describes a software application that is being viewed by the user.

The plurality of content items may be the entire set of content items that are available for presenting to the user or some subset of the entire set of content items that have been identified as most relevant according to some criteria by a retrieval system, e.g., a rules-based system, a machine-learning based system, or a system that combines the outputs of one or more machine learning models with one or more rules to identify relevant content items.

The primary objective is based on respective primary metric values 120 for each of the content items. For example, the primary metric may be a predicted click through rate or another metric that measures predicted user interaction with the ranked content items. As another example, the primary metric can be an information score, e.g., a PageRank score, that measures the relative importance of a content item.

The primary objective can be, for example, to generate a ranking that optimizes a weighted sum of the primary metric values, with the primary metric value for each content item being weighted by an attention weight for the corresponding position in the ranking that represents a likelihood that the user will select or otherwise interact with a content item that is presented at the position. In particular, the primary objective can be to find the ranking r that maximizes:

$$\sum_{i=1}^{n} c_i a[r_i],$$

where n is the total number of content items in the ranking, $c_i$ is the primary metric value for the i-th content item, and a $[r_i]$ is the attention weight for the position assigned to the i-th content item in the ranking r.

Each of the constraints corresponds to a respective second metric and is imposed based on respective second metric values 130 for each of the content items. Examples of second metrics include query-independent quality of the content items, a freshness of the content items, the type of content item (e.g., movie or software application genres, type of Internet resource, and so on), and so on.

The constraints can include equality constraints, i.e., the weighted sum of second metric values when weighted by attention weights should equal some threshold value, inequality constraints, i.e., the weighted sum of the metric values when weighted by attention weights should be greater than or equal to some threshold value, or both.

An inequality constraint for a second metric k can expressed as:

$$\sum_{i=1}^{n} M_{ki} a[r_i] \geq \theta_k,$$

where $M_{ki}$ is the second metric value for the second metric k for the i-th content item, and $\theta_k$ is the threshold value for the second metric k.

Similarly, an equality constraint for the second metric k can expressed as:

$$\sum_{i=1}^{n} M_{ki} a[r_i] = \theta_k.$$

A multi-constraint ranking engine 110 within the system 100 then generates a final ranking by iteratively updating a dual variable vector.

The dual variable vector includes respective values for each of a plurality of dual variables that each correspond to a different one of the constraints. Iteratively updating the dual variable vector is described below with reference to FIGS. 2 and 3.

Once the iterative updating has terminated, the system 100 generates the final ranking using the final dual variable vector and provides ranked content items 150 for presentation to the user, e.g., on the user device 160. That is, the system 100 provides the content items (or, more generally, data identifying each of the content items) for presentation on the user device 160 in an order that is determined by the ranking.

By generating the ranking using the described techniques for iteratively updating the dual variable vector, the system 100 can generate a high quality ranking, e.g., a ranking that maximizes the primary objective while satisfying the constraints in expectation, with minimal latency. As a particular example, the system 100 can generate a ranking that matches or exceeds the quality of a ranking that would be generated by a general purpose linear programming solver but with greatly reduced latency.

For example, the system 100 can provide search results identifying the content items, where the search results are ordered according to the ranking when presented on the user device.

Figure 2:
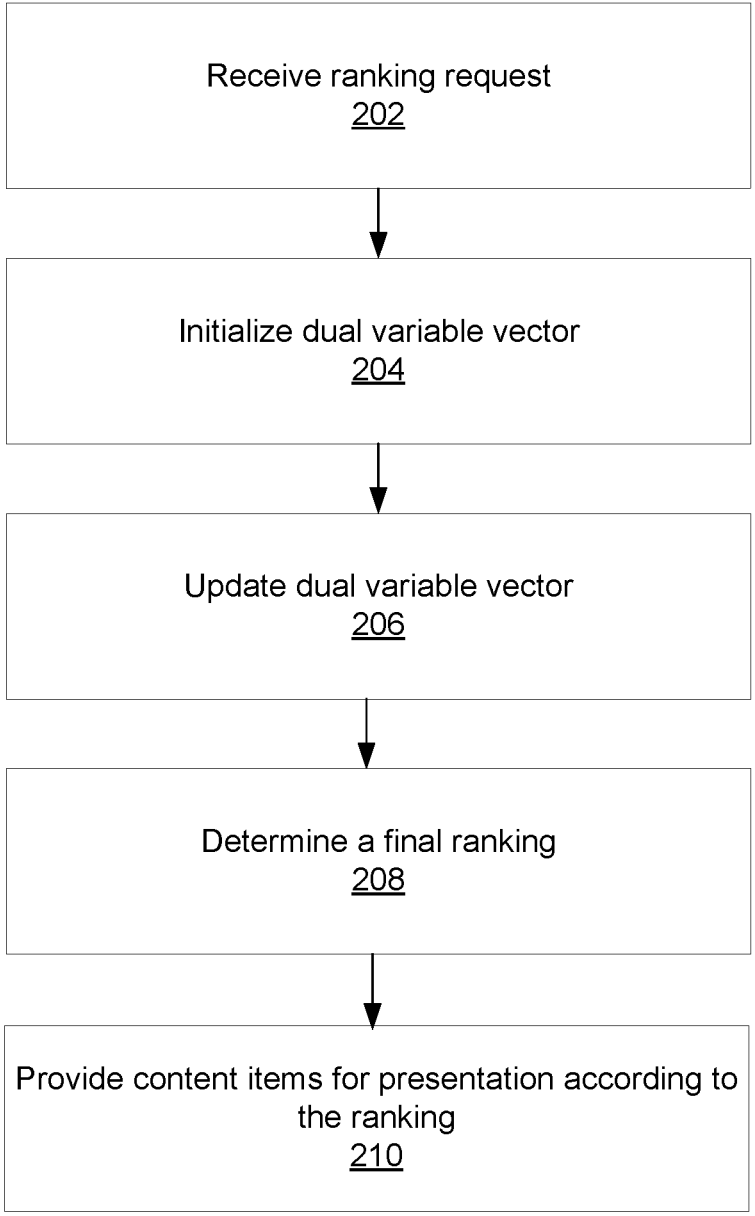
FIG. 2 is a flow diagram of an example process for ranking content items in response to a ranking request.

FIG. 2 is a flow chart of an example process 200 for ranking content items for presentation to a user. For convenience, the process 200 will be described as being performed by a system of one or more computers located in one or more locations. For example, a ranking system, e.g., the ranking system 100 of FIG. 1, appropriately programmed in accordance with this specification, can perform the process 200.

The system receives a request to rank a plurality of content items for presentation to a user to maximize a primary objective subject to a plurality of constraints (step 202).

As described above, the primary objective is based on respective primary metric values for each of the content items and each of the constraints corresponds to a respective second metric and is imposed based on respective second metric values for each of the content items. For example, a second constraint can require that the weighted sum of the second The system initializes a dual variable vector (step 204). The dual variable vector is a vector that includes respective values for each of a plurality of dual variables, with each of the dual variables corresponding to a different one of the constraints. In particular, when initialized, the dual variable vector includes a respective value for each of the constraints. As a particular example, the system can initialize the dual variable vector with random values sampled from some distribution or with pre-determined values, e.g., as a vector of zeroes.

The system updates the dual variable vector (step 206) over one or more update iterations. That is, at each update iteration, the system determines whether to update the dual vector as of the beginning of the iteration. Updating the dual variable vector is described in more detail below with reference to FIG. 3.

Generally, the system continues updating the dual variable vector until, at a given iteration, the system determines not to update the dual vector as of the beginning of the iteration.

When all of the constraints are equality constraints, the system can then use the dual variable vector as of the beginning of the final iteration as the final dual variable vector.

However, when some of the constraints are inequality constraints, the system can determine whether any of the dual variable values that correspond to inequality constraints are negative.

If (and only if) none of the dual variable values that correspond to inequality constraints are negative, the system can use the dual variable vector as of the beginning of the final iteration as the final dual variable vector.

If any of the dual variable values that correspond to inequality constraints are negative, the system can determine that those inequality constraints should not be active in the final solution, i.e., the values of the metrics for those constraints for the content items in the set are such that the presence or absence of those constraints would not modify the optimal solution to the constrained optimization. The system can then remove those constraints from consideration by removing the values in the dual variable vector that correspond to those constraints, i.e., decreasing the dimensionality of the dual variable vector.

The system can then perform step 206 again starting from the dual variable vector as of the beginning of the final iteration as the final dual variable vector (with the corresponding values removed) and continue performing step 206 until none of the dual variable values that correspond to inequality constraints are negative.

After updating the dual variable vector, the system determines a final ranking for the content items based on the dual variable vector (step 208).

That is, the system generates a final ranking for the content items using the dual variable vector after the one or more update iterations have been performed.

To determine the final ranking, the system ranks the content items according to ranking scores computed using the dual variable vector. The ranking score for a given content item given a dual variable vector is equal to or directly proportional to the sum of (i) the primary metric value for the content item and (ii) a weighted sum of the second metric values for the content item, with each second metric value weighted by the value for the dual variable corresponding to the corresponding second metric in the neighboring node dual variable vector.

For any content items that are tied in the ranking according to the ranking scores, the system then identifies a ranking of the tied content items that best optimizes the objective subject to the constraints through linear programming. Because linear programming is only used to solve for the ranking of a small number of tied content items while keeping the majority of the ranks of the content items constant (to the ranking determined using the ranking scores), the system can determine the solution with minimal latency.

The system provides the content items for presentation to the user according to the final ranking (step 210).

FIG. 3 is a flow chart of an example process 300 for performing an update iteration to update the dual variable vector. For convenience, the process 300 will be described as being performed by a system of one or more computers located in one or more locations. For example, a ranking system, e.g., the ranking system 100 of FIG. 1, appropriately programmed in accordance with this specification, can perform the process 300.

Generally, the process 300 involves identifying and evaluating candidate "nodes" in order to identify a node that minimizes an overall objective score.

A node, as used in this specification, is a dual variable vector that, when used to compute respective ranking scores for each of the content items, results in m distinct ties. Generally, m is a fixed integer value, e.g., m can be equal to the total number of values in the dual variable vector.

A tie occurs when a pair of content items both have the same ranking score according to a ranking defined by a dual variable vector. A set of ties is "distinct" if none of the ties in the set are implied by any other ties in the set. For example, the set of ties (1, 2), (2, 3), (3, 1) does not satisfy this as the third tie is implied by the first two and should be removed to generate the set of "distinct" ties.

The ranking score for a given content item given a dual variable vector is equal to or directly proportional to the sum of (i) the primary metric value for the content item and (ii) a weighted sum of the second metric values for the content item, with each second metric value weighted by the value for the dual variable corresponding to the corresponding second metric in the neighboring node dual variable vector. Thus, different dual variable vectors result in different ranking scores for different content items and, therefore, result in different numbers of ties.

The overall objective score that is being minimized is derived from the dual (with respect to the constraints) of the constrained optimization described above and therefore measures how well a ranking that is derived from a given dual variable vector solves the constrained optimization. In other words, the overall objective score measures an overall performance on the primary objective and the constraints of a ranking that is generated based on the dual variable vector.

In particular, to compute the overall objective score for a given dual variable vector, the system generates a ranking by ranking the content items according to ranking scores computed using the dual variable vector, i.e., with the content items being ranked in descending order of their ranking scores.

The system then obtains a respective attention score for each position in the ranking and computes a weighted sum of the ranking scores, with the ranking score for each content item weighted by the respective attention score for the position of the content item in the ranking. The system then computes, for each of the constraints, a product of the value in the given dual variable vector for the variable corresponding to the constraint and the threshold associated with the constraint.

The system can then determine the overall objective score by summing the weighted sum and the products for each of the constraints.

In some cases, the initialized dual variable vector may not be a node, i.e., may not result in m distinct ties. Thus, prior to performing the first iteration of the process 300, the system can determine an update to the initialized dual variable vector to identify an initial dual variable vector is that is a node, i.e., that, when used to compute respective ranking scores for each of the content items, results in m distinct ties and set the dual variable vector equal to the resulting dual variable vector, i.e., so that the resulting dual variable vector is used as the dual variable vector for the first iteration of the process 300.

The system can update the initialized dual variable vector to a node in any of a variety of ways.

As a particular example, the system can use the initialized dual variable vector to compute ranking scores for each of the content items. The system then identifies the m pairs of content items that are adjacent to each other when ordered according to the ranking scores and that have the m smallest distances in ranking scores between adjacent pairs. The system can then solve a system of linear equations to identify the values of the dual variable vector that results in each of the m pairs of content items having the same ranking score.

Once the initialized dual variable vector has been updated to a node, the system then proceeds to perform the process 300.

The system determines an overall objective score for the dual variable vector (step 302).

The system identifies a plurality of candidate dual variable vectors for the update iteration (step 304).

The candidate dual variable vectors include one or more neighboring node dual variable vectors and, optionally, one or additional candidate dual variable vectors.

Each neighboring node dual variable vector and, more generally, each candidate dual variable vector, is a different vector with respective values for the dual variables for the constraints, i.e., with a different combination of values than the current dual variable vector.

To identify the neighboring node dual variable vectors, the system can modify the current dual variable vector.

In particular, the system can identify as neighboring node dual variable vectors, nodes that, when used to compute respective ranking scores for each of the content items, result in m distinct ties, with m−1 of the ties being included in the set of distinct ties that result from the current dual variable vector being used to compute respective ranking scores for each of the content items.

That is, the system searches the space of possible nodes to identify nodes that "neighbor" the current dual variable vector, i.e., share m−1 ties with the node variable vector.

As a particular example, the system can use the current dual variable vector to compute ranking scores for each of the content items.

The system then computes, for each of the pairs of content items that are adjacent to each other when ordered according to the ranking scores, a signed distance from the current dual variable vector. The signed distance from the current dual variable vector for a pair (i,j) can be equal to the ratio of (i) the difference in ranking scores between i and j to (ii) a dot product between the current dual variable vector and a vector of the differences between the second metric values for the vector i and j. The system can then identify the pair having the smallest negative signed distance (i.e., closest to zero without being zero) and the pair having the smallest positive signed distance (i.e., closest to zero without being zero), and then identify, as neighboring nodes, dual variable vectors that replace any one of the ties for the current dual variable vector with one of the identified pairs.

The system determines respective overall objective scores for each of the one or more candidate dual variable vectors (step 306).

The system identifies the candidate dual variable vector with the best overall objective score (step 308).

The system determines whether to update the dual variable vector based on whether the identified candidate dual variable vector has a better overall objective score than the dual variable vector (step 310). As above, because the system is attempting to minimize the overall objective score, the system can consider a smaller overall objective score to be a "better" score.

In particular, in response to determining that the candidate dual variable vector has a better overall objective score than the dual variable vector, the system sets the dual variable vector equal to the identified candidate dual variable vector and proceeds to perform another update iteration, i.e., another iteration of the process 300.

In response to determining that the identified candidate dual variable vector does not have a better overall objective score than the dual variable vector at the iteration, the system terminates the updating, i.e., does not perform any more update iterations and uses the current dual variable vector at the iteration as the final dual variable vector that issued to generate the final ranking.

As described above, in other implementations, in response to determining that the identified candidate dual variable vector does not have a better overall objective score than the dual variable vector at the iteration, the system determines whether all of the values in the dual variable vector after the updating are non-negative.

In these implementations, the system terminates the updating and proceeds to generate the final ranking only if all of the values are non-negative.

If not all of the values are non-negative, i.e., the dual variable vector includes one or more negative values, the system removes, from the dual variable vector, the one or more negative values, i.e., reduces the dimensionality of the dual variable vector, and proceeds to perform another iteration of the process 300.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method performed by one or more computers, the method comprising:
   receiving a request to rank a plurality of content items for presentation to a user to maximize a primary objective subject to a plurality of constraints, wherein the primary objective is based on respective primary metric values for each of the content items, and wherein each of the constraints corresponds to a respective second metric and is imposed based on respective second metric values for each of the content items;
   initializing a dual variable vector that includes respective values for each of a plurality of dual variables that each correspond to a different one of the constraints that are imposed based on the respective second metric values for each of the content items, wherein:
   the dual variable vector defines a ranking of the plurality of content items according to ranking scores computed using the dual variable vector, and
   the ranking score for a given content item is based on (i) a primary metric value for the given content item and (ii) a weighted sum of second metric values for the given content item, with each second metric value weighted by the value for the dual variable corresponding to the corresponding second metric in the dual variable vector;
   updating the dual variable vector, comprising, one or more iterations:
   determining an overall objective score for the dual variable vector that measures an overall performance on the primary objective and the constraints of a ranking that is generated based on the dual variable vector;
   identifying a plurality of candidate dual variable vectors that includes one or more neighboring node dual variable vectors, wherein each neighboring node dual variable vector is a different vector with respective values for the dual variables for the constraints;
   determining respective overall objective scores for each of the one or more candidate dual variable vectors;
   identifying the candidate dual variable vector with a best overall objective score;
   determining whether the identified candidate dual variable vector has a better overall objective score than the dual variable vector; and
   in response to determining that the identified candidate dual variable vector has a better overall objective score than the dual variable vector, updating the dual variable vector to be the identified candidate dual variable vector;
   after updating the dual variable vector, determining a final ranking for the content items based on the dual variable vector; and
   providing the content items for presentation to the user according to the final ranking.

2. The method of claim 1, further comprising:
   in response to determining that the identified candidate dual variable vector does not have a better overall objective score than the dual variable vector at one of the iterations, terminating the updating.

3. The method of claim 1, wherein each neighboring node dual variable vector is a vector that, when used to compute respective ranking scores for each of the content items, results in m distinct ties, wherein:
   each tie is a pair of content items both having a same ranking score,
   m is a total number of constraints in the plurality of constraints, and
   the respective ranking score for each of the content items is equal to or directly proportional to a sum of (i) the primary metric value for the content item and (ii) a weighted sum of the second metric values for the content item with each second metric value weighted by the value for the dual variable corresponding to the corresponding second metric in the neighboring node dual variable vector.

4. The method of claim 3, wherein identifying the neighboring node dual variable vectors comprises:
   identifying, as neighboring node dual variable vectors, dual variable vectors that, when used to compute respective ranking scores for each of the content items, result in m distinct ties, with m−1 of the ties being included in a set of distinct ties that result from the dual variable vector being used to compute respective ranking scores for each of the content items.

5. The method of claim 4, wherein updating the dual variable vector further comprises, prior to performing any of the one or more iterations:
   determining an update to the initialized dual variable vector that results in a dual variable vector that, when used to compute respective ranking scores for each of the content items, results in m distinct ties; and
   setting the dual variable vector equal to the resulting dual variable vector.

6. The method of claim 3, wherein determining an overall objective score for the dual variable vector comprises:
   ranking the content items according to ranking scores computed using the dual variable vector;
   obtaining a respective attention score for each position in the ranking; and
   computing a weighted sum of the ranking scores with the ranking score for each content item weighted by the respective attention score for the position of the content item in the ranking.

7. The method of claim 6, wherein determining the overall objective score further comprises:
   for each of the constraints, determining a product of the value in the vector for the variable corresponding to the constraint and a threshold associated with the constraint; and
   determining the overall objective score by summing the weighted sum and the products for each of the constraints.

8. The method of claim 3, wherein determining a final ranking for the content items based on the dual variable vector comprises:
ranking the content items according to ranking scores computed using the dual variable vector; and
for any content items that are tied in the ranking according to the ranking scores, identifying a ranking of the tied content items that best optimizes the objective subject to the constraints through linear programming.

9. The method of claim 4, wherein the candidate dual variable vectors also include one or more non-neighboring node dual variable vectors that share fewer than m−1 ties with the dual variable vector.

10. The method of claim 1, further comprising:
determining that all of the values in the dual variable vector that correspond to inequality constraints are non-negative after the updating; and
generating the final ranking based on the dual variable vector only in response to determining that all of the values in the dual variable vector that correspond to inequality constraints are non-negative after the updating.

11. The method of claim 10, wherein the dual variable vector has fewer values than a total number of constraints in the plurality of constraints, wherein the dual variable vector is initialized using values from a previous dual variable vector that was previously updated at one or more previous iterations, and wherein initializing the dual variable vector comprises:
removing, from the previous dual variable vector, one or more values that correspond to inequality constraints and that were negative after the previous dual variable vector was previously updated at the one or more previous iterations.

12. The method of claim 11, further comprising:
determining not to generate the final ranking based on the previous dual variable in response to determining that not all of the values in the previous dual variable vector that correspond to inequality constraints were non-negative after the previous updating.

13. A system comprising one or more computers and one or more storage devices storing instructions that when executed by the one or more computers cause the one or more computers to perform operations comprising:
receiving a request to rank a plurality of content items for presentation to a user to maximize a primary objective subject to a plurality of constraints, wherein the primary objective is based on respective primary metric values for each of the content items, and wherein each of the constraints corresponds to a respective second metric and is imposed based on respective second metric values for each of the content items;
initializing a dual variable vector that includes respective values for each of a plurality of dual variables that each correspond to a different one of the constraints that are imposed based on the respective second metric values for each of the content items, wherein:
the dual variable vector defines a ranking of the plurality of content items according to ranking scores computed using the dual variable vector, and
the ranking score for a given content item is based on (i) a primary metric value for the given content item and (ii) a weighted sum of second metric values for the given content item, with each second metric value weighted by the value for the dual variable corresponding to the corresponding second metric in the dual variable vector;
updating the dual variable vector, comprising, one or more iterations:
determining an overall objective score for the dual variable vector that measures an overall performance on the primary objective and the constraints of a ranking that is generated based on the dual variable vector;
identifying a plurality of candidate dual variable vectors that includes one or more neighboring node dual variable vectors, wherein each neighboring node dual variable vector is a different vector with respective values for the dual variables for the constraints;
determining respective overall objective scores for each of the one or more candidate dual variable vectors;
identifying the candidate dual variable vector with a best overall objective score;
determining whether the identified candidate dual variable vector has a better overall objective score than the dual variable vector; and
in response to determining that the identified candidate dual variable vector has a better overall objective score than the dual variable vector, updating the dual variable vector to be the identified candidate dual variable vector;
after updating the dual variable vector, determining a final ranking for the content items based on the dual variable vector; and
providing the content items for presentation to the user according to the final ranking.

14. The system of claim 13, the operations further comprising:
in response to determining that the identified candidate dual variable vector does not have a better overall objective score than the dual variable vector at one of the iterations, terminating the updating.

15. The system of claim 13, wherein each neighboring node dual variable vector is a vector that, when used to compute respective ranking scores for each of the content items, results in m distinct ties, wherein:
each tie is a pair of content items both having a same ranking score,
m is a total number of constraints in the plurality of constraints, and
the respective ranking score for each of the content items is equal to or directly proportional to a sum of (i) the primary metric value for the content item and (ii) a weighted sum of the second metric values for the content item with each second metric value weighted by the value for the dual variable corresponding to the corresponding second metric in the neighboring node dual variable vector.

16. The system of claim 15, wherein identifying the neighboring node dual variable vectors comprises:
identifying, as neighboring node dual variable vectors, dual variable vectors that, when used to compute respective ranking scores for each of the content items, result in m distinct ties, with m−1 of the ties being included in a set of distinct ties that result from the dual variable vector being used to compute respective ranking scores for each of the content items.

17. The system of claim 16, wherein updating the dual variable vector further comprises, prior to performing any of the one or more iterations:
determining an update to the initialized dual variable vector that results in a dual variable vector that, when used to compute respective ranking scores for each of the content items, results in m distinct ties; and setting the dual variable vector equal to the resulting dual variable vector.

18. One or more non-transitory computer-readable storage media storing instructions that when executed by one or more computers cause the one or more computers to perform operations comprising:

receiving a request to rank a plurality of content items for presentation to a user to maximize a primary objective subject to a plurality of constraints, wherein the primary objective is based on respective primary metric values for each of the content items, and wherein each of the constraints corresponds to a respective second metric and is imposed based on respective second metric values for each of the content items;

initializing a dual variable vector that includes respective values for each of a plurality of dual variables that each correspond to a different one of the constraints that are imposed based on the respective second metric values for each of the content items, wherein:

the dual variable vector defines a ranking of the plurality of content items according to ranking scores computed using the dual variable vector, and the ranking score for a given content item is based on (i) a primary metric value for the given content item and (ii) a weighted sum of second metric values for the given content item, with each second metric value weighted by the value for the dual variable corresponding to the corresponding second metric in the dual variable vector;

updating the dual variable vector, comprising, one or more iterations:

determining an overall objective score for the dual variable vector that measures an overall performance on the primary objective and the constraints of a ranking that is generated based on the dual variable vector;

identifying a plurality of candidate dual variable vectors that includes one or more neighboring node dual variable vectors, wherein each neighboring node dual variable vector is a different vector with respective values for the dual variables for the constraints;

determining respective overall objective scores for each of the one or more candidate dual variable vectors;

identifying the candidate dual variable vector with a best overall objective score;

determining whether the identified candidate dual variable vector has a better overall objective score than the dual variable vector; and in response to determining that the identified candidate dual variable vector has a better overall objective score than the dual variable vector, updating the dual variable vector to be the identified candidate dual variable vector;

after updating the dual variable vector, determining a final ranking for the content items based on the dual variable vector; and providing the content items for presentation to the user according to the final ranking.

* * * * *